United States Patent
Blind et al.

(10) Patent No.: US 9,190,948 B2
(45) Date of Patent: Nov. 17, 2015

(54) OFFSET ANGLE DETERMINATION FOR SYNCHRONOUS MACHINES

(75) Inventors: Stefan Blind, Fellbach (DE); Daniel Raichle, Eberdingen-Nussdorf (DE)

(73) Assignee: ROBERT BOSCH GMBH, Stuttgart (DE)

(*) Notice: Subject to any disclaimer, the term of this patent is extended or adjusted under 35 U.S.C. 154(b) by 895 days.

(21) Appl. No.: 12/988,549

(22) PCT Filed: Apr. 16, 2009

(86) PCT No.: PCT/EP2009/054537
§ 371 (c)(1),
(2), (4) Date: Feb. 8, 2011

(87) PCT Pub. No.: WO2009/132965
PCT Pub. Date: Nov. 5, 2009

(65) Prior Publication Data
US 2011/0130996 A1 Jun. 2, 2011

(30) Foreign Application Priority Data
Apr. 28, 2008 (DE) .......................... 10 2008 001 408

(51) Int. Cl.
*G01C 17/38* (2006.01)
*G01C 9/00* (2006.01)
*H02P 25/02* (2006.01)
*H02P 6/18* (2006.01)

(52) U.S. Cl.
CPC .............. *H02P 25/021* (2013.01); *H02P 6/182* (2013.01)

(58) Field of Classification Search
CPC ..... H02P 6/182; H02P 25/021; G01D 5/2448; G01D 5/145

USPC ..................................................... 702/94, 151
See application file for complete search history.

(56) References Cited

U.S. PATENT DOCUMENTS

| | | | | |
|---|---|---|---|---|
| 4,468,598 | A | * | 8/1984 | Wagner .................. 388/844 |
| 4,723,100 | A | * | 2/1988 | Horikawa et al. ........ 318/400.41 |
| 5,300,884 | A | * | 4/1994 | Maestre .................. 324/207.25 |
| 6,081,087 | A | | 6/2000 | Iijima et al. |
| 7,026,773 | B2 | * | 4/2006 | Petersen ................. 318/400.01 |
| 7,274,163 | B1 | | 9/2007 | Lambert et al. |

(Continued)

FOREIGN PATENT DOCUMENTS

| | | |
|---|---|---|
| CN | 1619939 | 5/2005 |
| DE | 19641039 | 4/1998 |

(Continued)

OTHER PUBLICATIONS

International Search Report, PCT International Patent Application No. PCT/EP2009/054537, dated Jul. 31, 2009.

*Primary Examiner* — Michael Nghiem
(74) *Attorney, Agent, or Firm* — Kenyon & Kenyon LLP

(57) ABSTRACT

A method for determining an offset angle of an electric machine, including a stator, a rotor, and a shaft connected to the rotor is described. The shaft is provided in a (generally) no-load state, and the rotor is positioned with respect to the stator at a field angle. A sensor angle is determined by measuring with the aid of an angle sensor. The offset angle is provided as a function of the difference between the field angle and the sensor angle, and the configuration of the rotor includes impressing a standing or rotating stator magnetic field which corresponds to the field angle. An angle detection device for carrying out the method is also described.

10 Claims, 3 Drawing Sheets

(56) References Cited

U.S. PATENT DOCUMENTS

| | | |
|---|---|---|
| 2003/0037767 A1 | 2/2003 | Breitegger et al. |
| 2003/0210006 A1 | 11/2003 | Kusaka |
| 2005/0187735 A1* | 8/2005 | Nemeth-Csoka et al. .... 702/151 |
| 2006/0052976 A1* | 3/2006 | Chen et al. .................... 702/151 |
| 2007/0229012 A1 | 10/2007 | Lambert et al. |
| 2007/0282461 A1 | 12/2007 | Harwood |

FOREIGN PATENT DOCUMENTS

| | | |
|---|---|---|
| DE | 102005056207 | 6/2007 |
| JP | 60-51488 | 3/1985 |
| JP | 60 051488 | 3/1985 |
| JP | 6-165561 | 6/1994 |
| JP | 10-80188 | 3/1998 |
| JP | 11-150983 | 6/1999 |
| JP | 2001 204190 | 7/2001 |
| JP | 2002-112598 | 4/2002 |
| JP | 2003-79185 | 3/2003 |
| JP | 2003-319680 | 11/2003 |
| JP | 2006 296025 | 10/2006 |
| WO | WO 2005/062460 | 7/2005 |

\* cited by examiner

OFFSET ANGLE DETERMINATION FOR SYNCHRONOUS MACHINES

FIELD OF THE INVENTION

The present invention relates to a method for angle detection for electric machines.

BACKGROUND INFORMATION

Phase-locked electric machines, in which the rotor has the same rotational frequency as the stator rotational field, generate a torque which depends greatly on the angular offset between the rotor and the stator rotational field. Furthermore, there are numerous applications for electric machines in which the angular position of the drive shaft of the electric machine must be synchronized with the output, for example for use as a starter for internal combustion engines to whose camshaft a torque is applied, for a successful start it being necessary to precisely take the angular position of the camshaft into account.

Numerous conventional angle sensors for angle detection are manufactured separately from the electric machine and are mounted on the electric machine only after the latter is manufactured. This is the case in particular for hybrid drives, in which the angle sensor is first connected to the electric machine during assembly of the traction module (initial pairing) or during replacement of the electric machine or the angle sensor (component replacement for repairs, for example). Since the electric machine, which for hybrid drives is usually a synchronous machine, has already been provided with a stator and a housing after manufacture, only the shaft is accessible, and it is very difficult to ascertain the angular position of the rotor, in particular in relation to the starter windings. Due to the compact design of a traction module it is also complicated and difficult to mount an angle sensor on the synchronous machine at an accurate angle using markings. For initial pairing and for component replacement it is therefore difficult to accurately install the sensor on the shaft of the electric machine with high precision.

German Patent Application No. DE 10 2005 056 207 A1 describes a sensor system having multiple mutually offset sensor elements which may be adapted to various shaft diameters. However, the sensor elements allow only the relative angle to be ascertained in order to determine the angular velocity, and the determination of the absolute angle, taking an offset angle into account, is not considered.

The pairing of the angle sensor with the electric machine after these two components are manufactured thus results in an error angle, referred to as the "offset angle," due to which the phase-accurate control of the electric machine is inexact. For phase-locked electric machines such as synchronous motors, the actual torque is not accurately controllable due to the offset angle.

SUMMARY

An object of the present invention is to provide a mechanism by which the error angle between the angle sensor and the electric machine may be reduced.

In accordance with the present invention, the sensor is first paired with the electric machine, and an incorrect position is accepted, i.e., with an offset angle. The offset angle is then ascertained by simple energizing which does not require mechanical calibration. After the offset angle is known, the angular orientation of the rotor with respect to the stator may be computed based on the angle signal detected by the angle sensor by subtracting the offset angle. According to the present invention, after the pairing, i.e., after installation of the angle sensor, the electric machine is energized in such a way that a known field angle results, i.e., which allows the field angle to be determined using means which are independent of an angle sensor. The "field angle" refers to the orientation between the rotor and the stator, and according to the present invention relates to the angle between the rotor magnetic field and the magnetic field which is generated by the stator and acts on the rotor. The term "field angle" results from the orientation to the direction of the magnetic fields of the rotor and stator. An associated sensor angle, which is output as a signal from an angle sensor, may be linked to the field angle which is predefined or detected in this way. The angle sensor is connected to the shaft of the electric machine, and detects the position of the shaft. The shaft is connected to the rotor in a rotationally fixed manner, so that the sensor angle, taking into account the offset angle, represents the field angle. Thus, according to the present invention an angle calibration is carried out by setting a known angle as a standard, i.e., by setting a field angle which may be detected. The associated sensor angle is measured, resulting in an association between the known or detected field angle and the measured sensor angle. The offset angle which will be taken into account in the angle measurement in the future may thus be determined, the sensor angle being corrected, for example by computation, by the offset angle (which is now known) in order to provide the field angle.

Thus, according to the present invention an association is made between a detected sensor angle and a field angle due to the fact that the stator is brought into a known position by energizing the electric machine. In other words, the rotor is positioned at a field angle with respect to the stator in such a way that the field angle is provided with a known precision solely by energizing the electric machine.

For positioning the rotor at a known field angle, the present invention provides two alternatives, which may be used individually, in succession, and in particular in combination in order to increase the precision. In a first alternative, the stator is energized in such a way that it specifies a defined (i.e., known) magnetic field direction with which the rotor is aligned. To ensure alignment, the rotor is switched to a no-load state, i.e., mechanically decoupled from other load sources. The stator specifies a stationary or (slowly) rotating magnetic field, and the rotor is aligned until the stator no longer exerts a force on the rotor. After the rotor has been aligned with the stator field, the rotor and the stator field define an angle of 0° (or 90° or −90°, when the orientation of the rotor with respect to the stator winding in question is considered). Since the orientation of the stator, the stator winding, and thus also the field generated by the stator is known, the field angle is also known. After the rotor has assumed the force-free position, the angle sensor detects the sensor angle associated with the field angle. The sensor angle may be detected at the same time that the rotor is positioned at the predetermined field angle, or over a period of time after the rotor has been positioned at the predetermined field angle, over which the field angle does not change. When a stationary stator magnetic field is impressed, a stator winding is acted upon by a current which defines the orientation of the stator magnetic field. Likewise, multiple stator windings may be acted on by a current, the orientation of the resulting stator magnetic field resulting from the individual (weighted) components of the various stator windings. Furthermore, instead of a stationary stator magnetic field, a rotating stator magnetic field may be used, preferably a slowly rotating stator magnetic field, i.e., having a rotational speed of less than 100

1/min, less than 50 1/min, less than 20 1/min, less than 10 1/min, less than 5 1/min, less than 2 1/min, or less than 1 1/min. For a rotating stator magnetic field, the sensor angle is preferably measured at the same time that the rotor is positioned at the predetermined field angle. Alternatively, the sensor angle may be measured by the angle sensor over a known time period after the rotor has been positioned at a known field angle, from the rotational speed and the length of the time period it being possible to deduce the actual associated sensor angle which was provided at the point in time when the rotor was positioned at the predetermined field angle. In principle, the procedure described in this first alternative for positioning the rotor at a field angle is based on the fact that the stator specifies a predetermined magnet orientation with which the rotor is aligned. The field angle is thus directly determined by energizing the stator. In the vicinity of the neutral point of the stator (i.e., for a precise alignment according to the stator angle without the stator field exerting a force on the rotor) the forces acting on the rotor are very small ($\approx \sin(0\pm\delta)$), so that frictional forces which are usually present, for example as a result of the rotor bearing, result in a correction angle for which the friction prevents an exact alignment of the rotor. Such friction effects are a function of the design of the machine, and may, for example, be estimated, empirically determined, or prestored by model type. Thus, the offset angle may be determined more precisely by including the correction angle in the computation of the offset angle. Depending on the rotational direction before the sensor angle is detected, the correction angle is included with a negative or positive sign. The offset angle is thus obtained as the sum of the correction angle and the difference between the field angle and the sensor angle. As previously mentioned, the correction angle corresponds to the error angle position which results from frictional force. The correction angle provided by the error angle position is thus defined as the angle between a theoretical neutral position, in which the rotor is completely aligned with the stator field and thus no longer exerts a force on the rotor, and the actual angle assumed by the rotor; although the stator acts with a force on the rotor, this force is fully compensated by the friction, so that the rotor does not move further with respect to the theoretical neutral position. When the rotor is directly positioned at a predetermined field angle by energizing the stator, as described above, a stationary or a rotating stator magnetic field may be used as described; when a rotating stator magnetic field is used, the rotation is preferably carried out at a constant rotational speed, at least for a relaxation period, without accelerating the rotor. For a stationary as well as a rotating stator magnetic field, the sensor angle should be detected when the system has reached equilibrium, and therefore start-up effects (in particular acceleration effects), i.e., relaxation processes, have already died down.

According to the present invention, a second alternative is provided as a mechanism for positioning the rotor with respect to the stator, in this case the field angle not being directly known in advance by energizing the stator (i.e., directly energized), but, rather, the field angle itself being detected using a "field sensor system." The field sensor system is independent from an angle sensor, which measures the angle at a shaft of the electric machine. The stator or the stator windings, in which the rotor, via its rotation, induces a voltage which is directly linked to the field angle, are used here as the field sensor system. The sensor windings are preferably de-energized to allow the induced voltage to be detected therein. In this context, "de-energizing" means that no current is impressed into the stator windings by a current source or voltage source; i.e., the current flow within the stator is generally zero in order to avoid reactions on the rotor. It is therefore preferred to ensure that the winding connections are insulated from one another, or are connected to one another via a very high resistance. Current flow in the stator winding or windings is thus avoided, so that the winding(s) exert (generally) no force on the rotor. Reaction effects are thus avoided. Thus, to measure the induced voltage a voltage measuring device is preferably used which has a high internal resistance, so that the current within the stator winding is as low as possible when the induced voltage is detected. The induced voltage is preferably measured by connecting the stator winding or windings to a voltage measuring device which has an internal resistance of greater than 1 k$\Omega$, 10 k$\Omega$, 100 k$\Omega$, 1 M$\Omega$, 10 M$\Omega$, or 20 M$\Omega$. Before the field angle is detected via the induced voltage, according to the present invention the rotor is set in rotation by impressing a rotating stator magnetic field. Due to the inertia of the rotor, the rotor remains in the rotating state, even after the impressed rotating stator magnetic field is switched off. The stator windings, i.e., all the stator windings, are preferably de-energized directly after the phase of impressing the rotating stator magnetic field so that the induced voltage may be measured, while the rotor continues to rotate generally with no reduction in speed. After the rotor has been set in rotation, detecting a second offset angle as a function of a difference between a second field angle and a second sensor angle, all of the stator windings of the stator being de-energized while the rotation is continued. Even a certain deceleration due to friction effects does not decrease the precision of the field angle measurement, since the field angle measurement is completed within one full revolution of the shaft (preferably within a rotational angle which generally corresponds to a half-wave of the induced voltage). As a result of the rotation of the stator magnetic field during the impressing phase, the rotor is accelerated to a relatively high rotational speed, which in particular is greater than the rotational speed of the rotating stator magnetic field which is used when, as described above for the first alternative, the rotor is directly positioned according to the stator field by applying a specific stator field.

In the second alternative, the rotor is preferably set in rotation by the rotating stator magnetic field at a rotational speed of at least 200 1/min, at least 500 1/min, at least 1000 1/min, at least 1500 1/min, or greater. The selection of the rotational speed depends, on the one hand, on the magnitude of the induced voltage and thus on the possible precision of the voltage detection (the amplitude is proportional to the rotational speed), and on the other hand, the speed of detection of the induced voltage, i.e., the detection of the sensor angle by the angle sensor, in order to minimize errors or "jitters" which result from delay effects during detection of the induced voltage/field angle. The rotational speed is thus a function of the speed of detection of the induced voltage, the speed of detection by the angle sensor, the sensitivity of the measurement of the induced voltage, and the signal-to-noise ratio during detection of the induced voltage. The field angle may be determined by detecting the induced voltage in one stator winding or in multiple stator windings; in particular when two stator windings are used which are out of phase with one another, the point in time at which the induced voltage is equal in both stator windings may be determined. In addition, the particular minimum or maximum or the zero crossing of the induced voltage may be used as the measuring point in time. The field angle corresponding to this point in time corresponds to the center of the angle (geometric center or arithmetic center of the angle orientations of the stator windings used). Thus, according to the present invention a comparator or operational amplifier is used to determine when induced voltages of two stator windings are identical (including the algebraic sign), at the same time the angle sensor being sampled to determine the associated sensor angle. In this case the sensor angle is associated with a field angle which corresponds to the center of the angle of the stator windings in question, i.e., the angle orientation which is equidistant from the two orientations of the stator windings and which at the same time forms the minimum differential angle between the two stator winding orientations. The instantaneous amplitudes of the induced voltages at the winding ends are sampled, taking into account the magnitude and the algebraic sign of the voltage. Instead of detecting the associated sensor angle at the point in time at which the induced voltages are identical, the sensor angle may be detected after a predetermined time period after this point in time, and based on the rotational speed and the time period it being possible to deduce the sensor angle present at the point in time that the induced voltages were identical. In other words, a measurement may also be carried out after the point in time at which the induced voltages are equal, if the angle by which the rotor has rotated since the time of induced voltage equality is taken into account.

After the offset angle has been detected according to one of the above-described methods, the actual field angle may be computed from the sensor angle as follows: offset angle=field angle−sensor angle; i.e., field angle=sensor angle+offset angle. Thus, primarily for calibration purposes, after the angle sensor has been paired with the electric machine, the offset angle is ascertained according to one of the above-described methods or a combination thereof, the offset angle is stored in a memory, and is later taken into account for computing the field angle from the sensor angle alone. After the offset angle has been determined, the field angle is measured by sampling the angle sensor and adding the sensor angle thus obtained and the offset angle in order to determine the actual field angle. The field angle is preferably relayed to a master control system, for example a field-oriented regulation (FOR).

The method described above is suitable for a variety of electric machines, in particular synchronous machines, for example permanently excited synchronous machines. However, the synchronous machine may also be externally excited or self-excited. In particular when the method is used for offset angle determination for a synchronous machine which is used in a traction module of a hybrid drive, the precise field orientation thus obtained may be employed to use the synchronous motor as a starter for an internal combustion engine and also as a drive module for propulsion of a vehicle. The method is particularly suited for determining the offset angle or the field angle for electric machines in which the rotor is rotated at the rotational frequency of the stator magnetic field, and there is only a phase shift between the stator and the rotor, but no slip is present.

Moreover, the present invention is also implemented by an angle detection device which includes connections for energizing the stator in order to position the rotor at a field angle with respect to the stator. The angle detection device also includes connections for receiving signals which correspond to the sensor angle, i.e., connections for connecting to an angle sensor. When the angle detection device is also designed to be suitable for determining the field angle based on the induced voltage in the stator windings, the angle detection device preferably includes an input for at least one induced voltage which is generated in the stator, as well as a control connection which allows the stator windings to be disconnected from an electrical power supply. For example, the angle detection device may include an output for energizing power semiconductors which energize the stator, or may even include isolating switches which de-energize the stator windings.

The angle detection device also includes a data processing unit, for example a microprocessor or a CPU, which implements the steps of the example method according to the present invention, the example method steps being at least partially implemented by software and optionally partially implemented by hardware. The angle detection device also preferably includes a comparator, which is able to detect the equality of induced voltages, and which emits an appropriate signal, preferably a flank, at the appropriate point in time, or emits a time mark which represents the point in time.

Digital or analog devices may be used as angle sensors, preferably a digital sensor composed of three sensor elements which are offset by 120° with respect to one another. The sensor elements preferably output two levels: a first level which is within a range of 180° when an angle is detected, and a second level which is emitted when an angle is outside this range. The beginning and end of these ranges of the particular sensor elements are offset by 120° with respect to one another, as previously described. This results in a three-digit binary signal which may be used to determine the particular 60° sector in which the detected angle is present. The bit words associated with adjacent 60° sectors differ from one another by only one digit; in addition, bit words in which all digits have the same level are not permitted. Sensor errors or transmission errors may thus be easily identified. The angle signal emitted by the angle sensor is preferably represented in a Gray code. In order to deduce the exact angle from the three-digit digital signal which represents the 60° sector, the flanks of the digital signal and the associated points in time are detected; the rotational speed may be deduced from the speed of the flank sequence, and the exact extrapolated angle may thus be deduced from the point in time of a flank change and the detected rotational speed. The rising flank of the sensor element which corresponds to an absolute angle of 0-180°, i.e., which is offset by 0° with respect to the base position, is preferably used as a reference.

In one particularly preferred specific embodiment of the method according to the present invention, the first alternative is carried out first, followed by the second alternative of the method according to the present invention. A slow synthetic rotary field is first generated, the shaft of the electric machine being in a no-load, i.e., decoupled, state. In the extreme case, the slow synthetic rotary field may be slowed to a stationary field, so that this term when used below is also intended to include a stationary field. The rotor is aligned with the stator field, which allows the resulting sensor angle to be associated with the field angle defined by the alignment of the rotor. This results in a first, i.e., provisional, offset angle which is optionally acted on by a friction-related correction angle. However, the provisional offset angle is precise enough to run up the machine to a high rotational speed without the risk of damage to the electric machine due to faulty energizing. The machine is therefore calibrated with the aid of the provisional offset angle, and is energized taking the offset angle into account in order to reach a high rotational speed, for example 1000 1/min, whereupon the stator is switched into a freewheeling state; i.e., all electrical power sources are disconnected from the stator windings in order to achieve a stator current of essentially zero. A more precise offset angle is then detected based on the induced voltage in the freewheeling state. While the offset angle is being determined from the induced voltages in the freewheeling state, the rotor is preferably under no load, i.e., is not connected to any mechanical loads except for bearing friction or air friction inherent to the system. After detection has been carried out based on an additional sensor angle and an associated field angle (based on the induced voltage), and thus a more precise offset angle has been obtained, this offset angle is temporarily stored, and the machine is decelerated. The provisional offset angle is also preferably temporarily stored, or stored in a memory, for example directly after the provisional offset angle is computed. The impressing of the slow rotary field or stationary field, the computation and storing of the provisional offset angle, the updating of the angle sensor measurement according to the ascertained offset angle, the acceleration of the machine to 1000 1/min, the detection of the more precise second offset angle based on the induced voltages, and the deceleration of the machine are preferably carried out in succession within a short period of time, for example within a time period of less than 5 seconds, for example within 2 seconds. The impressing of the slow rotary field or stationary field and the impressing of the rotary field which results in acceleration of the machine to 1000 1/min are preferably carried out by a power electronics system, in particular a pulse-width modulation inverter, which is energized by a field-oriented regulation. The angle detection device according to the present invention is preferably connected to the field-oriented regulation. A vehicle management unit (VMU) which is directly or indirectly connected to the field-oriented regulation and to the power control system and which initiates or controls the method according to the present invention is preferably used as a monitoring control system. The mechanical decoupling of the shaft before carrying out the first offset angle measurement may be controlled by the VMU or some other control unit.

An example according to the present invention for offset calibration for an electric machine from a standstill, which together with an internal combustion engine VM is used in a hybrid drive of a vehicle, is described below. A pulse width controller PWC which controls electric machine EM is initially in the standby state, and the rotational speed of the electric machine is zero (standstill); the electric machine is able to freely rotate since a clutch which connects VM to EM is disengaged. A transmission of the hybrid drive is in idle mode, i.e., in state "P." PWR first checks as to whether the information "Initial offset calibration required" is stored in a memory, for example in an EEPROM. In this case PWR sets a diagnostic bit. VMU disengages the clutch between VM and EM. VMU ensures that the transmission is in state "P." VMU prompts PWR for an offset calibration. PWR then writes the information "Initial offset calibration required" into the EEPROM. PWR sets the diagnostic bit, and PWR sets the offset calibration state stored in the EEPROM to "To be performed." PWR determines an initial offset by setting the field angle to a predetermined value by specifying a stator field with which the rotor is aligned. PWR then accelerates EM to 1000 1/min, preferably taking the initial offset into account in controlling EM. After the acceleration, PWR carries out a precise offset calibration in which the field angle is ascertained based on the phase angle of the induced voltage. After calibration is completed, PWR writes the information "No offset calibration required/calibration performed" into the EEPROM, PWR is placed in standby mode, and EM is decelerated by actively short circuiting the stator windings. In general, after the offset angle is determined according to the above-described second alternative, EM may be decelerated via a low-resistance connection to the stator winding connections, or via some other current flow in the stator which decelerates the rotor through an interaction between the rotor and the stator. According to the described example, after the rotor is decelerated, the offset calibration is terminated by VMU, and VMU prompts for any desired state. Alternatively, VMU may also engage a clutch for the motor and thus initiate starting. VMU does not necessarily have to wait until the electric machine is decelerated.

An example according to the present invention for offset recalibration for an electric machine is described below, which together with an internal combustion engine VM is used in a hybrid drive of a vehicle. A pulse width controller PWC controls electric machine EM. VM is running, the rotational speed of EM is within a normal operating interval (according to a prompt, for example), and the voltage of a battery which drives EM is higher than an induced voltage which is applied to the stator. VMU (vehicle management unit) prompts an offset calibration, for example by transmitting an appropriate bit or signal to PWR. Alternatively, PWR may prompt an offset calibration (by emitting a signal or by setting a bit). PWR sets the offset calibration state stored in the EEPROM to "To be performed." PWR carries out a precise offset calibration based on the induced voltage, the rotation of EM being used for generating the induced voltage. Since EM is already running (the rotational speed is between a minimum rotational speed and a maximum rotational speed), use may be made of the rotation of the rotor without accelerating the rotor beforehand in an additional step. It is preferred that a check is made only to determine whether the instantaneous rotational speed of EM is suitable for a field angle measurement with the aid of the induced voltage. If the instantaneous rotational speed of EM is suitable, EM is neither accelerated nor decelerated before the calibration. For a rotational speed outside the rotational speed interval which is suitable for the calibration, EM is appropriately accelerated or decelerated to provide a suitable rotational speed. EM is preferably in a no-load state (by having clutches disengaged, for example), and a current which is generally zero flows through the stator windings in order to avoid mechanical reactions on the rotor. After calibration is completed, PWR writes the information "No offset calibration required/calibration performed" into the EEPROM. PWR is then again placed in a driving mode to be assumed according to driver input/VMU.

The example methods according to the present invention is particularly suited for electric machines of a vehicle hybrid drive in which the electric machine generates kinetic energy for traction of a vehicle. The electric machine may also be used as a starter for an internal combustion engine, which together with the electric machine operates in the hybrid drive as a drive unit. The drive unit may also include controllable transmissions and clutches. The electric machine is preferably a synchronous machine which is permanently excited, for example with the aid of a permanent magnet inside the rotor and/or by continuously energizing a rotor winding. The hybrid drive may be a mild hybrid, micro hybrid, full hybrid, or power hybrid in a serial or parallel design, in which the electric machine and the internal combustion engine may be used together or individually as a vehicle drive unit. The electric machine is provided with power from a rechargeable battery.

DETAILED DESCRIPTION OF EXAMPLE EMBODIMENTS

Figure 1:
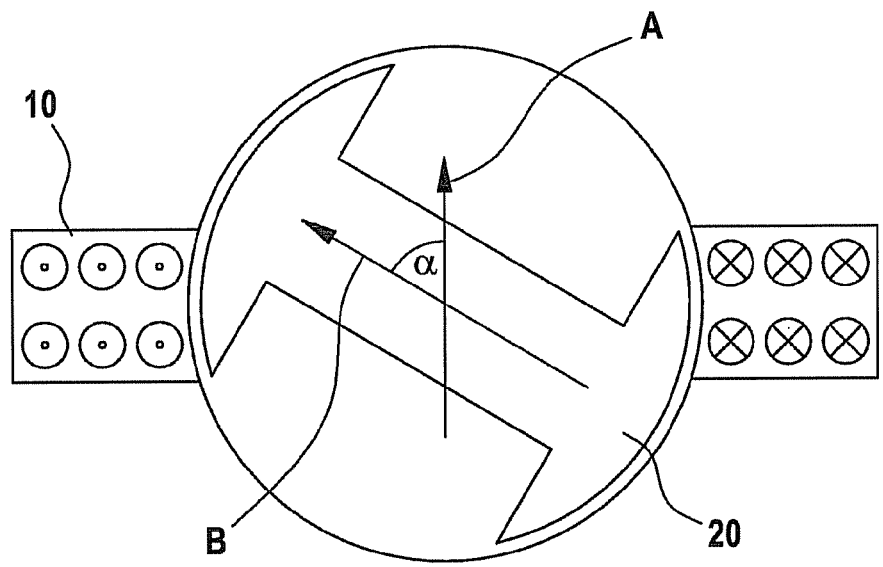
FIG. 1 shows a cross section of an electric machine for illustrating the orientation of the stator and the rotor.

FIG. 1 illustrates an electric machine having a stator winding 10 and a rotor 20. A current flowing through stator winding 10 exits the plane of the drawing in the winding section illustrated on the left, and enters the plane of the drawing in the winding section illustrated on the right. The magnetic field thus generated has the direction of arrow A, shown in a dashed line. For clarity only a single stator winding is illustrated; stator windings are typically uniformly positioned along the entire circumference of the stator. Stator 10 is excited (for example, with the aid of a permanent magnet or rotor winding, not illustrated), and has a magnetic field which is oriented in the longitudinal direction of the stator, as illustrated by arrow B. The force between the rotor and the stator is proportional to sin ($\alpha$), $\alpha$ corresponding to the angle between the field generated by the stator and the field of the rotor. Therefore, when the stator winding is acted on by a current, thus impressing a stator field, the rotor is aligned with this field until direction B matches direction A. Thus, when current is passed through stator winding 10 and the rotor is decoupled from all mechanical loads, the rotor is automatically positioned at a predetermined field angle which corresponds to the orientation of rotor winding 10. This allows the rotor to be positioned at a predetermined field angle, and the associated sensor angle may be detected, resulting in the corresponding offset angle.

Figure 2:
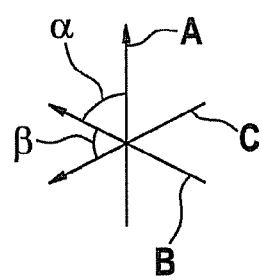
FIG. 2 shows an example of the orientation of the rotor, the stator, and a detected sensor angle direction.

FIG. 2 illustrates the orientation of starter magnetic field A and the orientation of rotor B, which correspond to the orientations in FIG. 1. As previously noted, the rotor is not yet aligned with the starter field. The rotor is connected via a shaft to an angle sensor which outputs an angle value corresponding to orientation C. When the rotor is aligned with the stator field, angle $\alpha$ equals 0 and the rotor assumes the known orientation of the stator winding which acts on the rotor. The incorrect position of the angle sensor, i.e., the offset angle, is then represented by $\beta$ when the stator field orientation corresponds to an absolute angle of 0.

The following discussion concerns the angle orientations which result when the field angle is detected by measuring the variation of the induced voltage over time, and the rotor is in rotation. In the present case, detecting the phase would result in the induced voltage of the field angles between the rotor and the stator winding in which the induced voltage is generated.

With reference to FIG. 2, in this case orientation A indicates the absolute orientation of the stator winding, and B indicates the orientation of the rotor which is ascertained from the phase of the induced voltage. The associated sensor angle defined in relation to rotor orientation B is illustrated by arrow C. Thus, the induced voltage causes an angular offset of $\alpha$ between stator winding orientation A and rotor orientation B, while the associated detected sensor angle corresponds to an orientation C which is offset by angle $\beta$ with respect to orientation B. In the following description, offset angle $\beta$ thus detected may simply be subtracted from the detected sensor angle, resulting in associated angle orientation B of the rotor.

While the rotor is aligned parallel to the stator field when the field angle is provided according to the first alternative (applying a stator field, aligning the rotor with the stator field), the induced voltage is provided as a derivative of the field in the stator winding, resulting in an extreme value when the rotor is parallel to the stator winding and assumes this orientation, resulting in a zero crossing when the rotor is perpendicular to the stator winding and assumes this orientation. Depending on the reference point and the alternative selected, this is taken into account when the field angle is detected, resulting in an angular difference of 90° between the plane containing the stator winding and the orientation of the stator field which is generated by the stator winding.

Figure 3:
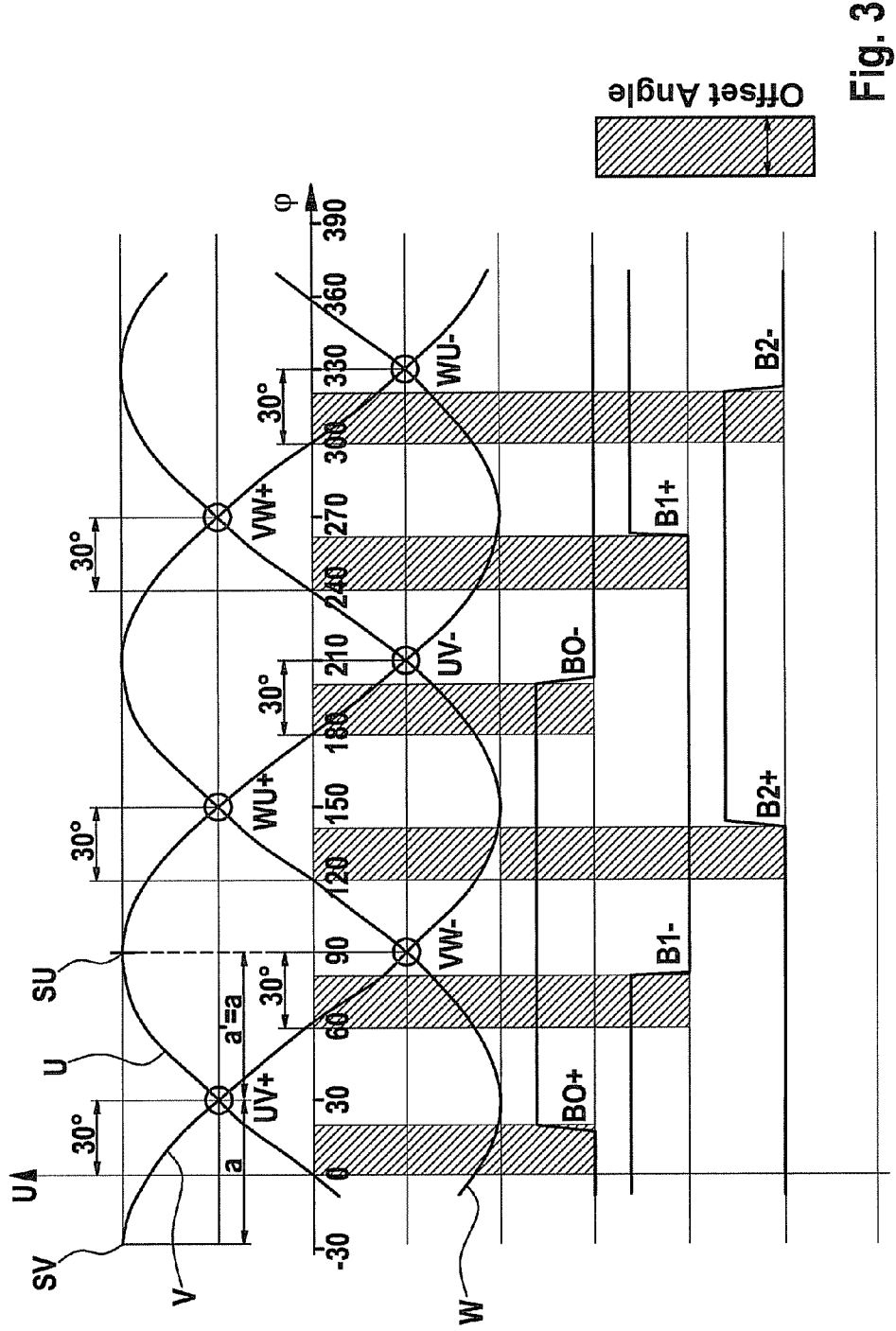
FIG. 3 shows a timing diagram with three-phase induced voltages.

FIG. 3 shows the three-phase induced voltage of stator windings, which are offset by 120° with respect to one another. Phase voltages U, V, and W are illustrated in a sinusoidal shape at the top, while the associated three-digit digital angle signals B0, B1, and B2 are illustrated in the lower part of the diagram of FIG. 3. Locations at which two equal induced voltages are applied to the stator windings are denoted by a circle. For example, for an angle $\phi$ of 30° the voltages of phases U and V are identical, so that at this point in time it is clear that the rotor is positioned in the center of the angle between the stator winding of phase U and the stator winding of phase V. In this way the field sensor system detects the field angle which is provided by the stator windings and the associated voltage detection. At the same time, the sensor angle is detected via signals B0, B1, and B2, in particular via the particular transition flanks of the sensor angle signals. It is seen that sensor angle signal B0 has no rising flank when $\phi$ equals 0, which would be the case if the angle sensor were precisely aligned with the field and the offset angle were equal to 0. Instead, the crosshatched area shows the offset angle by which the sensor angle signal trails the actual field angle. The field angle, i.e., the rotor position, is specified by the center of the alignment angle of the stator field, as illustrated by distances A and A' in FIG. 3. The offset angle may thus be determined by comparing the phase associated with intersection point UV+ to the associated sensor angle, i.e., to the phase of the flank of B0+, i.e., further sensor component signals B1 and B2. It is obvious from FIG. 3 that intersection point UV+ corresponds to a field angle of 30°, although the flank of B0+ indicates an angle which is decreased by the crosshatched area. In other words, flank B0+ would have to appear when $\phi$ equals 0, although the offset angle (crosshatched area) causes this delay. Thus, by expanding signals B0, B1, and B2 it is ascertained according to the present invention that at the point in time when $\phi$ equals 30° (determined using the induced voltages), the angle sensor indicates a sensor angle which is decreased by the offset angle; for an offset angle of 0, flank B0+30° would have to appear in front of intersection point UV+. Thus, the sensor angle (see phase voltages U, V, W; intersection points) may be used for future computation of the field angle, the offset angle being taken into account in such a way that in the case of FIG. 3 it is added to the value of the sensor angle.

To compute the geometric center of the alignment angles, in FIG. 3 the peak of phase voltages U and V is used. Instead, as is directly obvious from FIG. 3, the zero crossing of U and V may be used (0° and 60°, respectively). However, the two adjacent peaks (SV, SU) indicate the actual position of the stator windings in space which, due to the three-phase system, are offset by 120° with respect to one another. Distances A and A' thus correspond to one-half of 120°, i.e., 60°. It is obvious that phases U and V have been selected only as examples; the induced voltages of phase pairs V, W and U, W may likewise be compared to one another. The particular intersection points are identified by the corresponding phase names U, V, W, and are provided with a plus sign when the particular positive peaks (maxima) are selected as the reference point, and are provided with a minus sign when the adjacent negative peaks (minima) are selected as the reference point. As an example, intersection point VW– is used, for which phases V and W have the same voltage and intersection point VW– is positioned between two adjacent negative peaks of phases V and W, i.e., in the geometric center between these peaks. Center VW− is preferably computed as the arithmetic mean, i.e., 30° (negative peak, phase W)+150° (negative peak, phase V)=180°; 180/2 (mean formation by normalizing the sum)=90°. The value of 90° thus computed (summation of the angle values, division of the sum by the number of angle values used) is represented by intersection point VW−, and corresponds to the center of the orientations of the stator rotational field generated by phases V and W. Alternatively, the phase of a winding may be considered, the maximum of the phase being determined (U, for example; see peak SU), and the associated field angle being associated with the center of the orientations of the two other phases. As an example, FIG. 3 illustrates peak SU, which corresponds to the location of intersection point VW− and thus may be associated with the center of phase orientations V and W. For detecting the peak, instead of a comparator, a differentiator, for example, whose change of algebraic sign denotes the location of the peak, is used for detecting the equality of the induced voltages. A customary RC element may be used as a differentiator, preferably in conjunction with an operational amplifier. Likewise, a zero crossing detector may be used to detect the zero crossing of the induced voltage of a stator winding, the stator winding being perpendicular to the rotor at the point of the zero crossing. The direction of the change of the algebraic sign is preferably used to ascertain whether the rotor is inclined by +90° or by −90° with respect to the stator winding.

Figure 4:
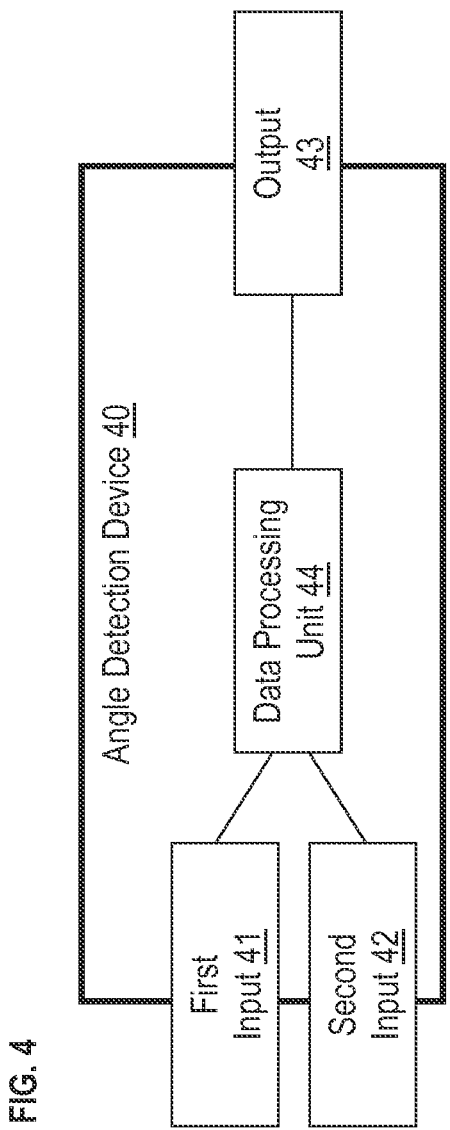
FIG. 4 shows an exemplary angle detection device.

FIG. 4 shows an exemplary angle detection device 40 that includes a first input connection 41 to detect an angle signal which represents a sensor angle, a second input connection 42 to detect an induced voltage signal which indicates an induced voltage which is generated by rotation of a rotor in an electric machine, an output connection 43 to output a control signal for the electric machine, and a data processing unit 44.

What is claimed is:

1. A method for determining offset angles of an electric machine including a stator, a rotor, and a shaft connected to the rotor, the method comprising:
   providing the shaft in a generally no-load state;
   positioning the rotor with respect to the stator at a first field angle which corresponds to an orientation of a rotor magnetic field generated by the rotor relative to an orientation of a stator magnetic field generated by the stator;
   applying a current to the stator windings to generate a rotating stator magnetic field and set the rotor to a first rotational speed;
   detecting a first sensor angle by measuring using an angle sensor which is connected to the shaft;
   determining a first offset angle as a function of a difference between the first field angle and the first sensor angle;
   accelerating the rotor to a second rotational speed that is higher than the first rotational speed by providing the stator magnetic field;
   de-energizing all stator windings of the stator while the rotation is continued by inertia;
   detecting a second field angle by measuring a variation over time of an induced voltage which is induced within the electric machine by the rotation of the rotor;
   detecting an instant at which induction voltages of two stator windings are equal;
   measuring a second sensor angle at the instant at which the induction voltages of two stator windings are equal; and
   determining a second offset angle as a function of a difference between the second field angle and the second sensor angle,
   wherein the stator magnetic field is a stationary or rotating field; and
   wherein setting the rotor in rotation to the first rotational speed occurs prior to detecting the second field angle such that the rotor remains in a rotating state after the stator magnetic field is de-energized when measuring the induced voltage.

2. The method as recited in claim 1, wherein the rotor is positioned by impressing a slowly rotating stator magnetic field having a rotational speed for which air resistance, bearing friction, and other loads which inhibit rotation of the rotor are negligible, and the first field angle is an angle which: i) corresponds to an orientation of the stator winding which generates the stator magnetic field, or ii) corresponds to a mean of angles of all stator windings weighted according to an exerted force on the rotor.

3. The method as recited in claim 1, wherein one of: i) the first offset angle is the difference between the first field angle and the first sensor angle, or ii) the first offset angle is provided as a sum of a correction angle and the difference between the first field angle and first sensor angle, the correction angle corresponding to an error angle position between a zero position angle in which no force is exerted on the rotor, and an angle in which a force is exerted on the rotor which is equal to frictional force acting on the rotor.

4. The method as recited in claim 1, wherein the second field angle is detected by phase detection of the induced voltage which is induced in the stator, the rotation of the rotor in each case induces voltage in at least two stator windings which are oriented at different alignment angles, and the second sensor angle is provided by the geometric center of the alignment angles when the induced voltages of different stator windings are equal.

5. The method as recited in claim 1, wherein detecting the second field angle includes comparing an instantaneous amplitude of induced voltages which are generated in at least two different stator windings by rotation of the rotor, the stator windings being oriented at different alignment angles.

6. The method as recited in claim 1, wherein the rotor is positioned by impressing a rotating stator magnetic field, and the field angle and the sensor angle are detected at the same time.

7. The method as recited in claim 1, wherein the electric machine is at least one of a synchronous machine, an externally excited or self-excited synchronous machine, a permanently excited synchronous machine, a synchronous machine which is provided as an electrical traction module of a hybrid drive, or a direct current machine.

8. A method for determining offset angles of an electric machine including a stator, a rotor, and a shaft connected to the rotor, the method comprising:
   providing the shaft in a generally no-load state;
   positioning the rotor with respect to the stator at a first field angle which corresponds to an orientation of a rotor magnetic field generated by the rotor relative to an orientation of a stator magnetic field generated by the stator;
   detecting a first sensor angle by measuring using an angle sensor which is connected to the shaft, the detected first sensor angle being associated with the first field angle;
   detecting a first offset angle as a function of a difference between the first field angle and the first sensor angle;
   after the first offset angle has been detected, setting the rotor in rotation by providing the stator magnetic field; and
   after the rotor has been set in rotation, detecting a second offset angle as a function of a difference between a second field angle and a second sensor angle, all of the stator windings of the stator being de-energized while the rotation is continued, the second sensor angle being measuring by using the angle sensor which is connected to the shaft, the second field angle being detected by measuring variation over time of the induced voltage which is induced within the electric machine by the rotation of the rotor, and the second sensor angle being associated with the second field angle, wherein the stator magnetic field is one of a stationary rotating field; and wherein setting the rotor in rotation occurs prior to detecting the second field angle such that the rotor remains in a rotating state after the stator magnetic field is de-energized when measuring the induced voltage.

9. An angle detection device comprising:

an input connection to detect an angle signal which represents sensor angles;

an input connection to detect an induced voltage signal which indicates an induced voltage which is generated by rotation of a rotor in an electric machine;

an output connection to output a control signal for the electric machine; and a data processing unit to:
  position the rotor with respect to stator in the electrical machine at a first field angle which corresponds to an orientation of a rotor magnetic field generated by the rotor relative to an orientation of a stator magnetic field generated by the stator,
  detect a first sensor angle by measuring using an angle sensor which is connected to a shaft connected to the rotor, the detected first sensor angle being associated with the first field angle,
  calculate a first offset angle as a function of a difference between the first field angle and the first sensor angle,
  set the rotor in rotation by providing the stator magnetic field,
  de-energize all stator windings of the stator while the rotation is continued,
  detect a second field angle by measuring the variation over time of an induced voltage which is induced within the electric machine by the rotation of the rotor,
  detect a second sensor angle by measuring using an angle sensor which is connected to a shaft connected to the rotor, the second angle being associated with the second field angle, and
  calculate a second offset angle as a function of a difference between the second field angle and the second sensor angle,
  wherein the stator magnetic field is one of a stationary or rotating field, the rotor being positioned by using the control signal; and wherein setting the rotor in rotation occurs prior to detecting the second field angle such that the rotor remains in a rotating state after the stator magnetic field is de-energized when measuring the induced voltage.

10. An angle detection device comprising:

an input connection to detect an angle signal which represents a sensor angle;

an input connection to detect an induced voltage signal which indicates an induced voltage which is generated by rotation of a rotor in an electric machine;

an output connection to output a control signal for the electric machine; and a data processing unit to:
  position the rotor with respect to stator in the electrical machine at a field angle which corresponds to an orientation of a rotor magnetic field generated by the rotor relative to an orientation of a stator magnetic field generated by the stator,
  detect the sensor angle by measuring using an angle sensor which is connected to a shaft connected to the rotor, the detected sensor angle being associated with the field angle,
  detect a first field angle corresponding to an angular winding of the stator which exerts a force on the rotor,
  calculate a first offset angle as a function of a difference between the field angle and the sensor angle,
  after the first offset angle has been calculated, set the rotor in rotation by providing the stator magnetic field, and
  after the rotor has been set in rotation, all of the stator windings of the stator being de-energized while the rotation is continued, detect a second field angle being detected by measuring variation over time of the induced voltage which is induced within the electric machine by the rotation of the rotor, and
  calculate at least one second offset angle as a function of a difference between the second field angle and the sensor angle,
  wherein the rotor is positioned by using the control signal; and wherein setting the rotor in rotation occurs prior to detecting the second field angle such that the rotor remains in a rotating state after the stator magnetic field is de-energized when measuring the induced voltage.

\* \* \* \* \*